United States Patent [19]

Liantonio

[11] Patent Number: 4,650,155
[45] Date of Patent: Mar. 17, 1987

[54] ANTI-CAVITATION VALVE ASSEMBLY
[75] Inventor: Vito Liantonio, Glen Cove, N.Y.
[73] Assignee: Target Rock Corporation, East Farmingdale, N.Y.
[21] Appl. No.: 548,665
[22] Filed: Nov. 4, 1983
[51] Int. Cl.⁴ ............................................. F16K 47/00
[52] U.S. Cl. ..................................... 251/118; 251/35; 251/121
[58] Field of Search ................. 251/30, 44, 121, 333, 251/35, 118, 120, 123, 210; 137/630.14, 630.15, 625.3

[56] References Cited
U.S. PATENT DOCUMENTS

| Re. 25,338 | 2/1963 | Olson | 251/30 |
|---|---|---|---|
| 1,777,261 | 9/1930 | Grainger et al. | 251/121 |
| 2,897,836 | 8/1959 | Peters et al. | 251/118 |
| 2,965,129 | 12/1960 | Faust | 251/DIG. 3 |
| 3,521,852 | 7/1970 | Gillis | 251/121 |
| 3,880,399 | 4/1975 | Luthe | 137/625.37 |
| 3,896,834 | 7/1975 | Paul | 251/DIG. 3 |
| 4,108,210 | 8/1978 | Luthe et al. | 137/625.28 |
| 4,436,111 | 3/1984 | Gold et al. | 251/DIG. 3 |

FOREIGN PATENT DOCUMENTS

| 1816002 | 6/1970 | Fed. Rep. of Germany | 251/121 |
|---|---|---|---|
| 2439225 | 2/1976 | Fed. Rep. of Germany | 251/118 |
| 1080266 | 12/1954 | France | 251/120 |
| 1334387 | 7/1963 | France | 251/121 |
| 440524 | 2/1975 | U.S.S.R. | 251/118 |

Primary Examiner—Samuel Scott
Assistant Examiner—Noah Kamen
Attorney, Agent, or Firm—Eisenman, Allsopp & Strack

[57] ABSTRACT

The valve assembly for the control of flow of liquid from a source of liquid at high pressure to a place of use has at least one restrictive orifice adjacent a movable valve member and valve seat to provide pressure drops in series in the liquid each of which pressure drops is of a magnitude sufficient to maintain the liquid pressure above the vapor pressure of the liquid at the inlet of the valve assembly so that cavitation does not occur. The restrictive orifice varying in flow area automatically in direct proportion to the variable flow area between said movable valve member and the valve seat.

7 Claims, 3 Drawing Figures

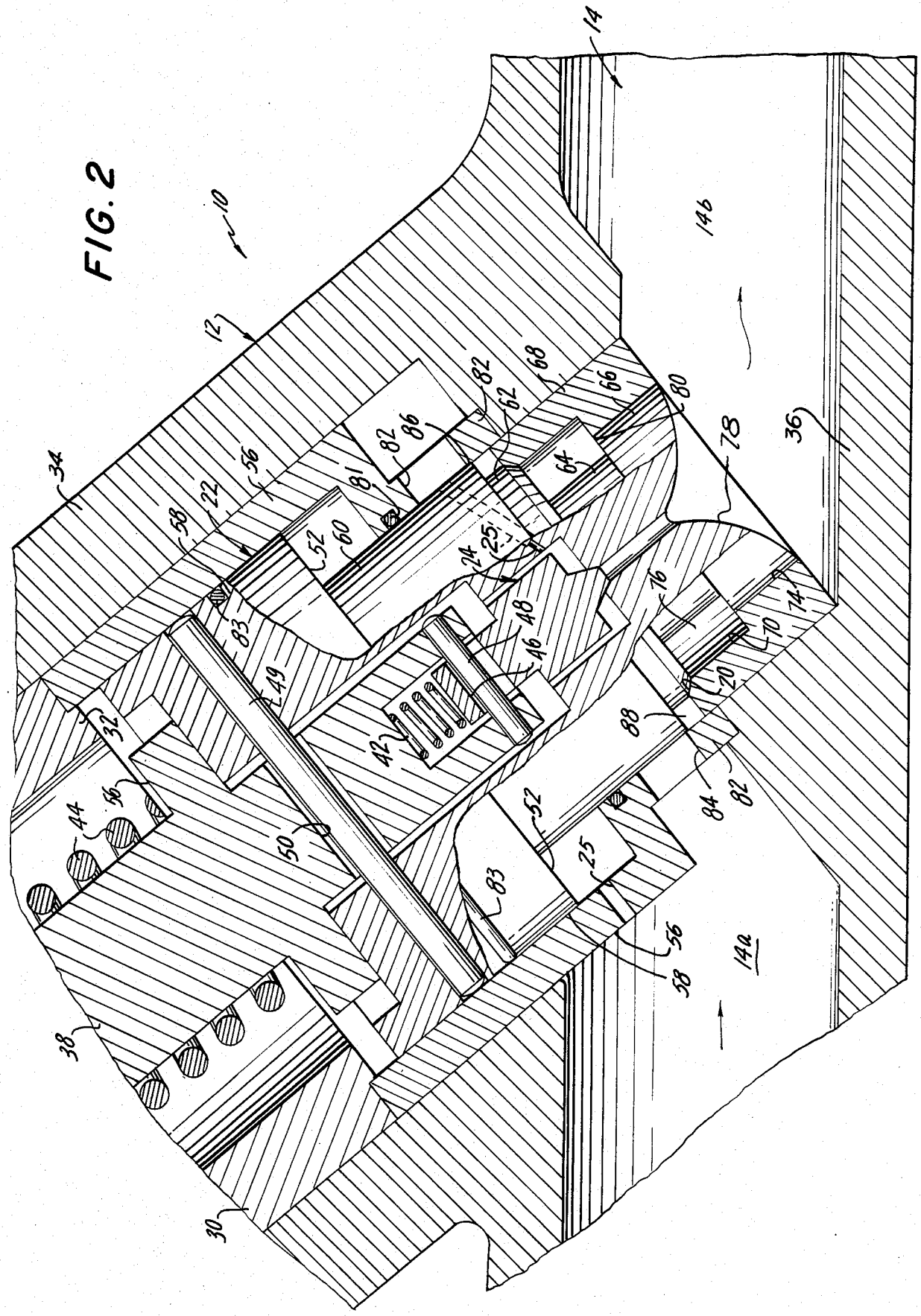

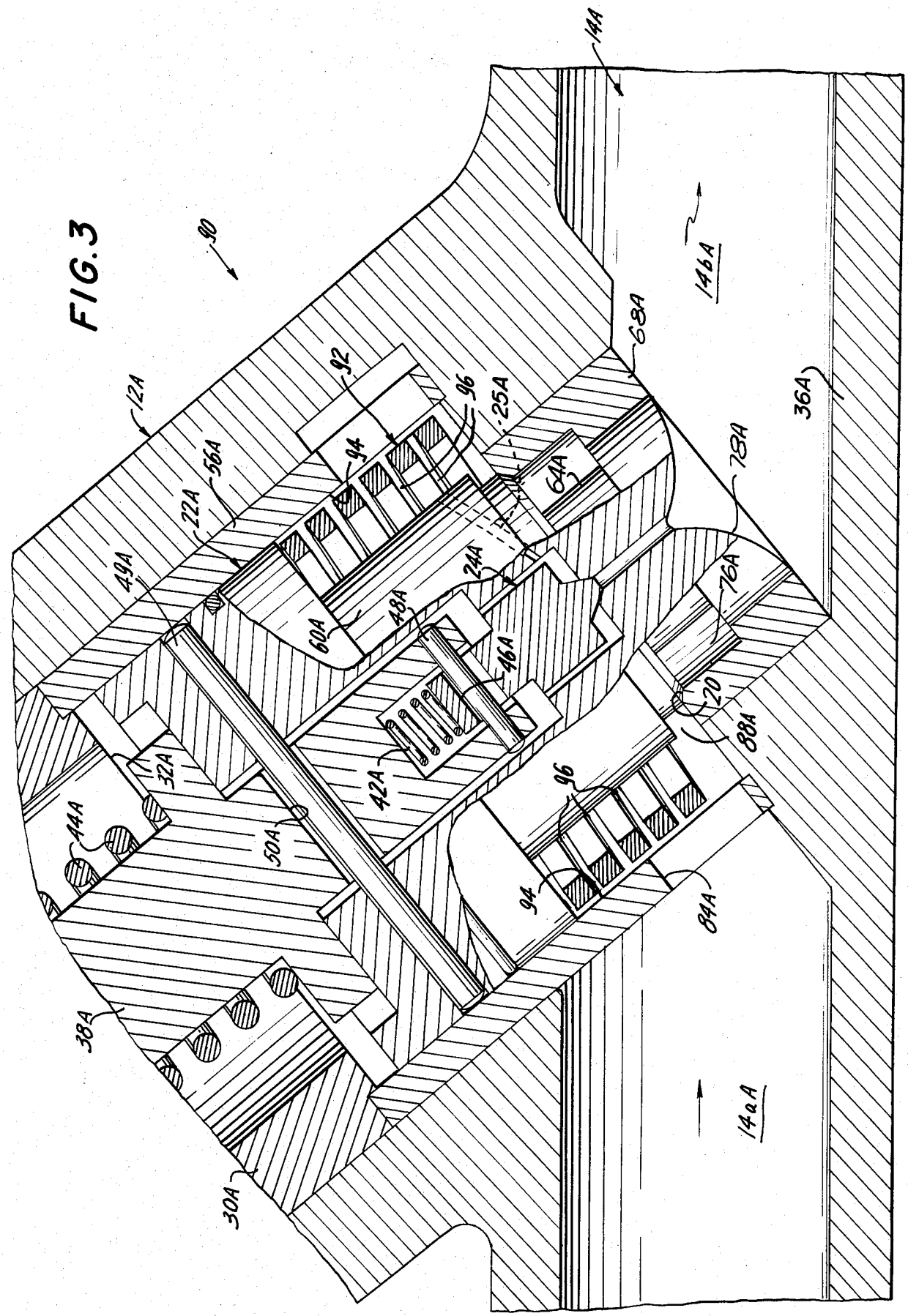

ANTI-CAVITATION VALVE ASSEMBLY

This invention relates to valves for controlling liquid flow and, more particularly, to a valve assembly having anti-cavitation means.

BACKGROUND OF THE INVENTION

In heretofore known valves, such as pilot operated, modulating solenoid valves, a phenomenon called cavitation can occur where the valve is utilized to control flow of non-degassed liquids. Cavitation is produced when a liquid has flashed to form local cavities or bubbles which thereafter collapse. Flashing occurs when the pressure of the liquid falls below the vapor pressure, and bubble collapse occurs when the pressure of the liquid returns to a value above its vapor pressure. This process of cavitation causes erosion, noise and impedes liquid flow, as well as producing a drop in efficiency of fluid machinery. It has been found in valve assemblies that the rapid pressure drop across the open valve is at times of such a magnitude that the liquid pressure drops below the vapor pressure and hence results in cavitation. A cavitation condition is of particular concern in pilot operated, modulating valves which operate to temperatures of 1000° F. and pressures of 10,000 psi or greater and have frequent valve open and close cyclic operation. The difficulty of obviating cavitation in pilot operated, modulating valves is that the construction of such valves limits movements to relatively small distances as compared with on-off valves of conventional design. This undesirable cavitation phenomenon is substantially minimized in the valve assembly according to this invention.

It is, therefore, an object of the present invention to provide a valve assembly for the control of liquid flow wherein cavitation is substantially minimized. It is another object of this invention to provide a valve assembly for the control of liquid flow which is less subject to erosion and quieter in operation than heretofore known liquid flow control valves. It is a further object of this invention to provide liquid flow control valve assembly which provides relatively free flow of liquid therethrough.

SUMMARY OF THE INVENTION

In view of the foregoing, the present invention contemplates a novel valve assembly for controlling the flow of liquid which in its broadest aspect comprises a body portion having a liquid inlet communicating with a source of liquid and a liquid outlet for passing liquid from the valve assembly and at least one valve seat disposed between said inlet and said outlet. A movable valve member is disposed in the body portion for reciprocative movement between a position against said valve seat to prevent flow of liquid from said inlet to said outlet and a fully open position away from said valve seat to allow flow of liquid from the inlet to the outlet. A port means is located between said inlet and the valve seat which coacts with the movable valve member to provide a variable restriction to liquid flow which is directly proportional to the variable flow area between said movable valve member and the valve seat.

In a narrower aspect of this invention, the port means includes a stationary sleeve within which the movable valve member is disposed for reciprocative movement toward and away from said valve seat and which sleeve has a plurality of circumferentially spaced first openings, the flow areas of which vary in size with the positions of the movable valve member away from the valve seat. The port means further includes a bore in the body portion spaced downstream of the valve seat and an extension of the movable valve member which projects beyond the valve seat into said bore and for slidable movement relative thereto. The extension of the movable valve is constructed so that at least one second opening is defined between the end of the bore and the extension, and which second opening varies in size in direct proportion to the distances of the movable valve member away from the valve seat. The first and second openings provide, in cooperation with the coaction of the movable valve member and valve seat, a series of pressure drops of relatively small magnitude to prevent, at each point, the liquid pressure falling below the vapor pressure of the liquid at the inlet of the valve body, thus, substantially minimizing the possibility of producing the phenomenon known as cavitation.

A feature of the present invention is that the movable valve member is a disc which is slidable in a stationary sleeve and has a first and second reduced diameter portions, the first reduced diameter portion being adapted to seat or engage the valve seat, while the second reduced diameter portion has a diametral notch in the end thereof to form, with the end of the bore in which it is slidably disposed, variable orifices or openings for the last in the series of pressure drops of the liquid in flowing from the inlet to the outlet.

In a second embodiment of this invention, the stationary sleeve is dimensioned so that it is spaced from the first reduced diameter portion of the disc to form an annular space in which a helical spring is disposed, the spacing between the coils forming a plurality of restricted orifices or openings. The spring is connected to the disc so that, as the disc moves, the space between the spring coils vary in size. Thus, the plurality of parallel openings vary in flow area in direct proportion to the change in the distance of the first reduced diameter portion of the disc from a seated position against the valve seat.

BRIEF DESCRIPTION OF THE DRAWINGS

The invention will be more fully understood from the following detailed description thereof when considered in connection with the accompanying drawings wherein two embodiments of the invention are illustrated by way of example and in which:

FIG. 2 is an enlarged fragmentary portion of a portion of the valve assembly shown in FIG. 1; and FIG. 3 is an enlarged fragmentary portion of the valve assembly, similar to FIG. 2, showing a second embodiment of the present invention.

DESCRIPTION OF THE PREFERRED EMBODIMENTS

Figure 1:
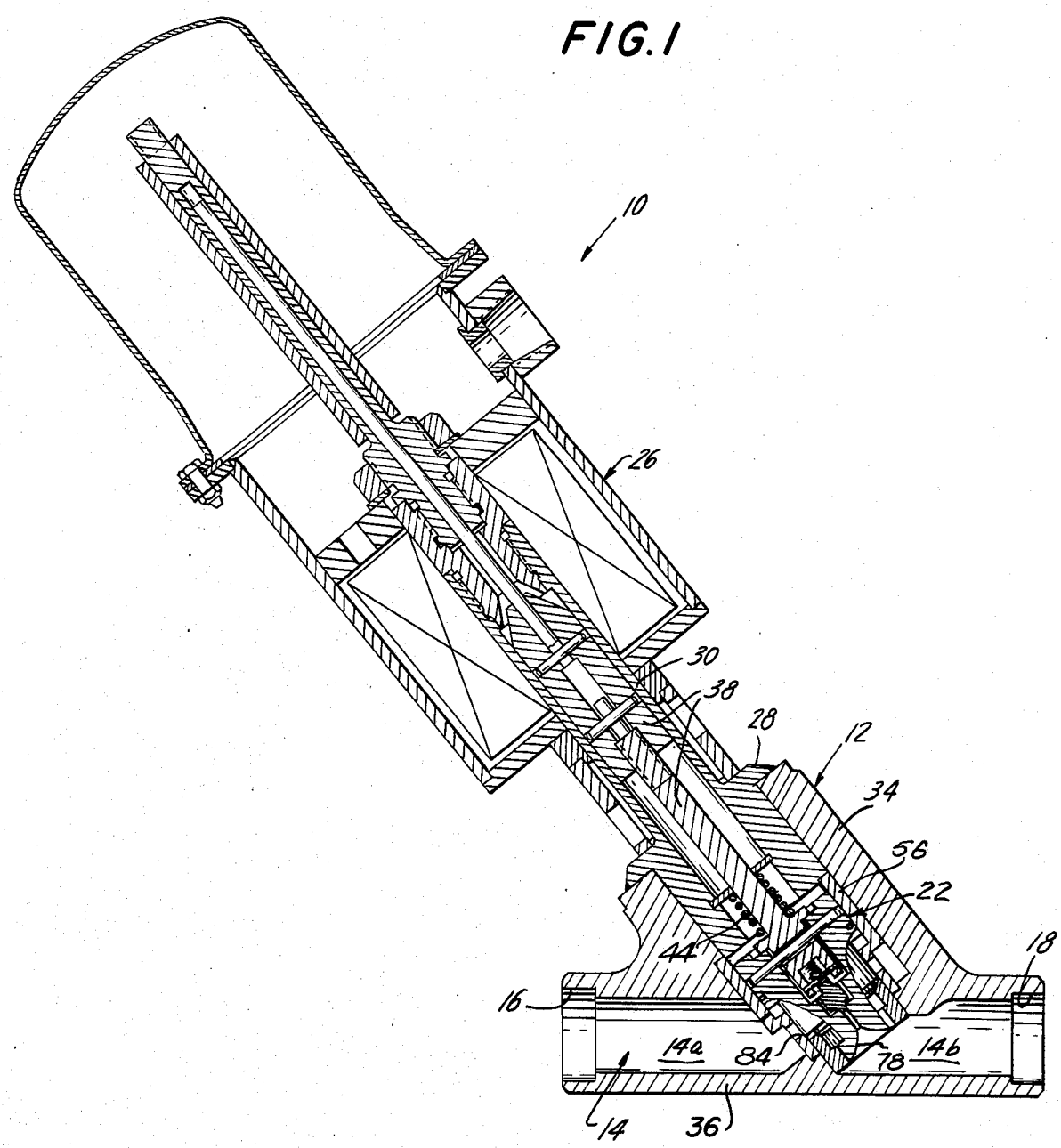
FIG. 1 is a view in cross section of a valve assembly according to a first embodiment of this invention for the control of liquid flow.

Now, referring to the drawings and more particularly to FIGS. 1 and 2, the reference number 10 generally designates the valve assembly according to a first embodiment of this invention. It is to be understood, while the valve assembly 10 is shown and will be described as a pilot operated, modulating, solenoid liquid flow control valve assembly, the invention is not necessarily limited thereto. While the invention is particularly desirable for pilot operated modulating types of valves, it is not limited thereto. Therefore, the invention is shown and described in a pilot operated, modulating, solenoid liquid flow control valve assembly only for illustration purposes; that the invention has application to many types of liquid flow control valves, particularly those that operate under high liquid temperatures and pressures and where valve movements are restricted to very small distances without, departure from the scope and spirit of this invention.

The valve assembly 10 shown in FIGS. 1 and 2 briefly comprises a valve body 12 having a liquid passageway 14 which has at one end an inlet port 16 and at the opposite end an outlet port 18. A main valve seat 20 is formed in passageway 14 between inlet and outlet ports 16 and 18. The portion of passageway 14 upstream from valve seat 20 will be identified as inlet passageway 14a, while the downstream portion of passageway 14 will be referred to as outlet passageway 14b. A main movable valve member 22 (sometimes referred herein as a "main disc") is mounted for reciprocative movement within valve body 12 to positions where the movable valve member is abutting valve seat 20 and hence prevents flow of liquid through passageway 14 and a fully open position where the movable valve member is spaced away from valve seat 20 a maximum distance. Since valve assembly 10 is a pilot operated, modulating type valve, a pilot valve 24 is mounted for reciprocative movement within a bore in main valve member 22. In addition, the valve assembly 10 has an electromagnetic assembly or solenoid motor 26 for controlling the operation of the pilot valve 24 and hence main valve member 22. The electromagnetic assembly 26 is supported on a bonnet assembly 28 which is connected and forms part of valve body 12. The bonnet assembly 28 generally comprises an elongated, non-magnetic, tubular member 30 positioned at an open end 32 within a generally cylindrical portion 34 of valve body 12, which portion 34 extends angularly with respect to a valve portion 36 through which extends passageway 14. The tubular member 30 is mounted in valve portion 34 in spaced relation to valve seat 20 and coaxial therewith.

In operation of valve assembly 10, liquid in passageway 14 supplied thereto through inlet port 16 from a source of supply (not shown), enters the valve through bleed passageways 25 so that inlet pressure acts on all surfaces of pilot valve 24 and main disc 22, thus permitting spring 42 and return spring 44 to urge or bias pilot valve 24 and main movable valve member 22, respectively, in a seated or closed position, as shown. When it is desired to open main movable valve member 22, the solenoid 26 is energized by a suitable source of electrical power (not shown). The magnetic flux lines thus generated upon energization cause pilot armature 38 to axially move against the force of a return spring 44. This axial movement of pilot armature 38 against the biasing force of spring 44, also unseats pilot valve 24 without acting on the main movable valve member 22 because of the lost motion provided between pin 48 and its associated slot 46 and pin 49 and its associated slot 50 in armature 38. Continued energization and axial movement unseats main movable valve member 22 to the full open position, assisted by the pressure differential across main valve member 22. This pressure differential across main valve member 22 is caused by the opening or unseating of pilot valve 24 which communicates the interior of the valve with the outlet port 18 and thus effects a reduction in liquid pressure acting against the main valve member surfaces in a direction toward valve seat 20. Therefore, with inlet liquid pressure still acting against the surface 52 via bleed passageway 25 in a stationary sleeve 56, and the pressure on the opposite surfaces of main valve member 22 reduced, a resultant force is exerted on main valve member 22 in a direction to unseat the latter. Once liquid pressure equilibrium across main valve member 22 is reached, any change in liquid inlet or outlet pressure will change the differential pressure across the main valve member and cause its movement in response to such pressure differential. The large sudden pressure drop of the liquid as it flows past valve seat 20 into outlet passageway 14b and the resultant cavitation is avoided in valve assembly 10 in accordance with the present invention as hereinafter fully described.

As best shown in FIG. 2, valve assembly 10, main valve member 22 has a cylindrial portion 58, a first reduced diameter portion 60 and second reduced diameter portion 62 which has an end shaped and dimensioned to seat against valve seat 20. The main movable valve member 22 also has a third reduced diameter portion 64 and an enlarged diameter end portion or extension 66. The stationary sleeve 56, which is disposed between open end 32 of tubular member 30 and the valve seat 20, is so formed and dimensioned that the peripheral surfaces of portions 58 and 60 of main valve member 22 slidably engage the interior surface of sleeve 56. The valve seat 20 is formed along the inner edge of a ring element 68 which is suitably secured in housing or body portion 12 of valve assembly 10. The interior surface of ring element 68 has a counterbored portion 70 which forms an enlarged diameter, inner annular surface and a reduced diameter, inner annular surface 74. The inner annular surface 74 slidably engages the outer peripheral surface of enlarged diameter portion 66 of main disc 22. The second and third reduced diameter portions 62 and 64, enlarged portion 66 and annular surface of counterbored portion 70 define an annular secondary inlet chamber 76. The end of enlarged portion 66 of main disc 22 has a diametral notch or groove 78 therein. This groove 78 coacts with upper peripheral edge portion 80 of inner annular surface 74 to define variable flow area orifices or outlets communicating annular inlet chamber 76 with outlet passageway 14b.

The stationary sleeve 56 has a reduced diameter end portion 82, the inner surface of which slidably engages first reduced diameter portion 60 of main valve member 22. The interstices between the main disc portion 60 and the inner surface of sleeve 56 is sealed by an O-ring seal 81 while the interstices between the adjacent surfaces of portion 58 of main disc 22 and sleeve 56 are sealed by an O-ring 83. A plurality of circumferentially spaced ports 84 are provided in reduced diameter end portion 82. These ports 84 coact with the end edge 86 of first reduced diameter end portion 60 of main disc 22 to provide variable flow area orifices or outlets communicating inlet passageway 14a with the annulus 88 formed by the reduced diameter end portion 82 of sleeve 56, the end of ring element 68, and reduced diameter portions 60 and 62 of main disc 22.

In operation, the orifices defined by ports 84 and end edge 86 of main valve member 22 function as first stage variable flow area restrictions upstream of valve seat 20. The orifices defined by groove 78 and edge portion 80 form second stage variable flow area restrictions downstream of valve seat 20. The first and second stage variable flow area restrictions are so sized in relation to the total predetermined pressure drop of the liquid from inlet passageway 14a to outlet passageway 14b that at each stage and at valve seat 20 a pressure drop is achieved without the liquid falling below its vapor pressure and hence avoids the phenomenon known as cavitation. The total flow area at the first and second stages varies in direct proportional relationship to the movement of main valve member 22 toward and away from seat 20. Thus, valve assembly 10 automatically effects the avoidance of cavitation as changes in the pressure differential between the liquid in inlet passageway 14a and in outlet passageway 14b occur and cause modulation of main valve member 22.

In FIG. 3 a portion of a valve assembly 90 is shown, which assembly constitutes a second embodiment of this invention. Valve assembly 90 essentially differs from valve assembly 10 in that the first stage variable flow area restrictions are defined by a helically wound spring 92 instead of the coaction between first reduced diameter portion 60 of the main valve member 22 and ports 84 in stationary sleeve 56 as has been disclosed for valve assembly 10. Accordingly, parts of valve assembly 90, similar to parts of valve assembly 10, will be identified by the same reference number with the suffix A added thereto.

As shown in FIG. 3, the stationary sleeve 56A does not have a reduced diameter portion 82 as does stationary sleeve 56, but is of substantially uniform diameter to form an annulus 94 between its inner surface and the outer peripheral surface of first reduced diameter portion 60A. In annulus 94 is disposed helical spring 92 which is preferably formed from wire of rectangular cross-section. The spring is so dimensioned and assembled that as main valve member or main disc 22 moves between its fully open and closed positions, the space 96 between next adjacent coils increase and decrease in direct proportion to the movement of main valve member 22A. The spaces 96 form variable flow area restriction orifices which function to communicate inlet passageway 14aA, via ports 84A, with space, in annulus 94, formed between the inner surface of the coils of spring 92 and outer surface of first reduced portion 60A of main disc 22A and annulus 88A.

The valve assembly 90 is operationally the same as valve assembly 10 in that it provides for a controlled, sequential pressure drops of the liquid flowing from inlet passageway 14aA and outlet passageway 14bA in sequential or series stages such that at each stage and at valve seat 20A the liquid does not drop below its vapor pressure and hence obviates cavitation.

It is believed now readily apparent that the present invention provides a novel valve assembly for non-degassed liquids wherein the possibility of cavitation is greatly minimized or wholly eliminated. It is a valve assembly which is quiet in operation and has a relatively long operative life by reason of being less subject to erosion and damage. The invention also provides a pilot operated modulating valve wherein cavitation is obviated.

It is not the intention hereof to restrict applications of the invention by the figures and description thereof, but rather it should be understood that the present disclosure is to illustrate the concepts and principles of the present invention and that changes or alterations thereto obvious to one skilled in the art would still come within the scope of this disclosure. Also, it should be understood that the figures are deliberately not drawn to scale and are exaggerated in some respects for clarity. Therefore, although the preferred embodiments of the valve assembly of this invention have been disclosed, it should be obvious that the present disclosure is made by way of example only and that variations are possible without departing from the subject matter coming within the scope of the following claims, which claims are regarded as the invention.

What is claimed is:

1. A valve assembly for the control of flow of liquid comprising:
   (a) A body portion having a liquid inlet communicating with a source of liquid and liquid outlet for passing liquid from the valve assembly;
   (b) at least one valve seat in the body portion disposed between said inlet and said outlet;
   (c) an axially movable cylindrical valve member having
      (i) a seat engaging portion disposed in the body portion for reciprocative movement between a position against said valve seat to prevent flow of liquid from said inlet to said outlet and a fully open position away from said valve seat to allow flow of liquid from said inlet to said outlet;
      (ii) a second flow controlling cylindrical portion on the inlet side of the seat engaging portion and having a diameter greater than the seat engaging portion to define together with the body portion a first chamber; and
      (iii) a third flow controlling cylindrical portion on the outlet side of the seat engaging portion having a diameter smaller than the seat engaging portion to define together with the body portion a second chamber separated from the first chamber by the valve seat and its seat engaging portion;
   (d) port means disposed between said inlet and the first chamber and coacting with the second flow controlling portion of movable valve member to provide a variable restriction to liquid flow into the first chamber which automatically varies in flow area in direct proportion to the variable flow area between said movable seat engaging portion and the valve seat; and
   (e) second port means disposed between the outlet and the second chamber and coacting with the third flow controlling portion of the movable valve member to provide a variable restriction to liquid flow out of the second chamber which automatically varies in flow area in direct proportion to the variable flow area between the movable seat engaging portion and the valve seat of such magnitude that cavitation in the liquid does not occur.

2. The apparatus of claim 1 wherein said port means is a stationary sleeve within which the movable valve member is disposed for reciprocative movement relative thereto, said sleeve having a plurality of circumferentially spaced openings, the flow areas of which vary in size with the positions of the movable valve member away from said valve seat.

3. The apparatus of claim 1 wherein said port means comprises a stationary sleeve surrounding and radially spaced from the movable valve member to define therebetween the first chamber as an annular space, the sleeve has a plurality of circumferentially spaced openings, and a helical spring disposed in said annular space and connected to the movable valve member so that as the latter moves, the coils of the spring move toward and away from each other to thereby provide a plurality of flow passages from said inlet to the outlet which vary in flow area proportionally to the open positions of the movable valve member.

4. In a pilot operated, modulating valve assembly
(a) a valve body portion having an inlet and outlet port;
(b) an axially movable main valve member in the body portion having at least four coaxial cylindrical co-portions the first three of which have successively reduced diameters progressing from the inlet to the outlet ports followed by a fourth cylindrical portion having a diameter larger than the smallest of the first three;
(c) said valve body portion having sleeve portions slidably receiving the first and fourth cylindrical portions of the valve member in guiding relationship and a valve seat disposed adjacent the second cylindrical portion;
(d) said valve member having a disc carried by the second cylindrical portion to engage the valve seat in sealing relationship;
(e) said body portion defining first and second chambers surrounding the second and third cylindrical portions, said chambers being separated by the disc;
(f) first port means defined by the sleeve portion of the body portion which guides first cylindrical portion of the valve member to connect the inlet port to the first chamber; and
(g) second port means defined by the sleeve portion which guides the fourth cylindrical portion of the valve member to connect the second chamber to the outlet, whereby unseating the disc establishes at least three sequential pressure drops from the inlet port to the first chamber across the face of the disc to the second chamber and from the second chamber to the outlet.

5. The apparatus of claim 4 said first port means comprises
a stationary sleeve in the body portion surrounding and radially spaced from the movable valve member to define therebetween the first chamber as an annular space, the sleeve having a plurality of circumferentially arranged openings; and
a helical spring disposed in the annular space and connected to the movable valve member so that as the latter moves the coils of the spring move toward and away from each other to thereby provide a plurality of flow passages upsteam of said valve seat which vary in flow area in direct proportion to the distance the movable valve member is away from said valve seat.

6. The apparatus of claim 5 wherein said helical spring has a polygonal shape in cross section.

7. The apparatus of claim 4 wherein the fourth cylindrical portion is notched in its surface facing the outlet to form a flow path from the second chamber which increases in size in direct proportion to the disc movement away from the valve seat.

* * * * *